(12) United States Patent
Landers et al.

(10) Patent No.: US 8,789,083 B1
(45) Date of Patent: Jul. 22, 2014

(54) SYSTEM FOR SESSIONIZING LOG EVENTS FROM A STREAMING LOG EVENT SOURCE AND REDUCING LATENCY

(71) Applicant: Google Inc., Mountain View, CA (US)

(72) Inventors: Martin Landers, Zürich (CH); Wolfgang Haas, Zürich (CH); Andy Chu-I Yu, Mountain View, CA (US); Stefan Hilzinger, Rueschlikon (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/731,684

(22) Filed: Dec. 31, 2012

Related U.S. Application Data

(60) Provisional application No. 61/708,356, filed on Oct. 1, 2012.

(51) Int. Cl.
| | |
|---|---|
| *H04H 60/32* | (2008.01) |
| *H04H 60/33* | (2008.01) |
| *H04H 20/14* | (2008.01) |
| *H04N 7/10* | (2006.01) |

(52) U.S. Cl.
USPC ........ 725/14; 725/9; 725/10; 725/16; 725/21; 725/22; 725/32

(58) Field of Classification Search
None
See application file for complete search history.

(56) References Cited

U.S. PATENT DOCUMENTS

| | | | | |
|---|---|---|---|---|
| 6,804,627 | B1 * | 10/2004 | Marokhovsky et al. | 702/182 |
| 2007/0011330 | A1 * | 1/2007 | Dinker et al. | 709/226 |
| 2010/0228855 | A1 * | 9/2010 | Sim et al. | 709/224 |
| 2010/0262986 | A1 * | 10/2010 | Adimatyam et al. | 725/9 |
| 2011/0107386 | A1 * | 5/2011 | de los Reyes et al. | 725/118 |
| 2011/0307913 | A1 * | 12/2011 | Wang et al. | 725/9 |
| 2012/0124606 | A1 * | 5/2012 | Tidwell et al. | 725/17 |
| 2012/0254911 | A1 * | 10/2012 | Doe | 725/14 |

* cited by examiner

*Primary Examiner* — Brian T Pendleton
*Assistant Examiner* — Alexander Gee
(74) *Attorney, Agent, or Firm* — Amin, Turocy & Watson, LLP

(57) ABSTRACT

Systems and methods for reducing latency times associated with sessionizing log events from streaming logs are disclosed herein. In an aspect, event data related to user consumption of media content items can be monitored. Further, respective event data based at least in part on user playback of the media content items can be analyzed. In another aspect, pending and finalized event data can be summarized into a finalized playback record. In yet another aspect, the size of a time window can be adjusted based in part on observed logsaver latency. Further, in an aspect, watch time data can be integrated into a de-spamming pipeline.

20 Claims, 16 Drawing Sheets

SYSTEM FOR SESSIONIZING LOG EVENTS FROM A STREAMING LOG EVENT SOURCE AND REDUCING LATENCY

CROSS-REFERENCE TO RELATED APPLICATION

This application claims priority to U.S. Provisional Patent Application No. 61/708,356, filed on Oct. 1, 2012 and entitled "SYSTEM FOR SESSIONIZING LOG EVENTS FROM A STREAMING LOG EVENT SOURCE AND REDUCING LATENCY". The entirety of this application is incorporated herein by reference.

TECHNICAL FIELD

This disclosure relates to reducing the latency time associated with summarizing log events from a streaming log event source.

BACKGROUND

Logging user events is a process whereby certain events are logged such as for example number of users consuming a particular video at respective playback time intervals. Logging of such user events can provide useful analytics regarding user consumption of content that can facilitate future user viewing experience as well as improve monetization of content. Conventional logging of user viewing information generally involves a long latency period whereby log event data is summarized, in some instances, more than twenty four hours after data is collected. Consequently, such logging information can be stale with respect to current relevancy towards enhancing user viewing experience or monetization of content.

SUMMARY

The following presents a simplified summary of the disclosure in order to provide a basic understanding of some aspects of the disclosure. This summary is not an extensive overview of the disclosure. It is intended to neither identify key or critical elements of the disclosure nor delineate any scope particular embodiments of the disclosure, or any scope of the claims. Its sole purpose is to present some concepts of the disclosure in a simplified form as a prelude to the more detailed description that is presented later.

In accordance with one or more embodiments and corresponding disclosure, various non-limiting aspects are described in connection with sessionizing log events from a streaming log event source and reducing latency time associated with sessionizing log events. In accordance with a non-limiting embodiment, in an aspect, a latency reduction system is provided comprising a memory having stored thereon computer executable components, and a processor configured to execute the following computer executable components stored in the memory: a monitoring component that monitors watch time event data related to user consumption of media content items; an aggregation component that aggregates the watch time event data; an analysis component that analyzes respective watch time event data based at least in part on user playback of the media content items; and a summarization component that summarizes the pending and finalized watch time event data into a finalized playback record.

In various aspects, the latency reduction system can further comprise a map-reduce component that partitions events into data sets to be processed on different machines to produce the pending and finalized playback record. In another aspect, the latency reduction system can comprise a learning component that provides timely trending information within a confidence level based in part on summarized data received from the summarization component. In yet another aspect, the latency reduction system can comprise a diagnostic component that automatically diagnoses network slowdowns and computer effects that slow media content delivery. Further, in an aspect, the latency reduction system can comprise an integration component that integrates watch time data into a de-spamming pipeline.

The disclosure further discloses a method, comprising using a processor to execute computer executable instructions stored in a memory to perform the following acts: monitoring watch time event data related to user consumption of media content items; aggregating the watch time event data; analyzing respective watch time event data based at least in part on user playback of the media content items; and summarizing pending and finalized watch time event data into a finalized playback record.

The following description and the annexed drawings set forth certain illustrative aspects of the disclosure. These aspects are indicative, however, of but a few of the various ways in which the principles of the disclosure may be employed. Other advantages and novel features of the disclosure will become apparent from the following detailed description of the disclosure when considered in conjunction with the drawings.

DETAILED DESCRIPTION

Overview

Figure 1:
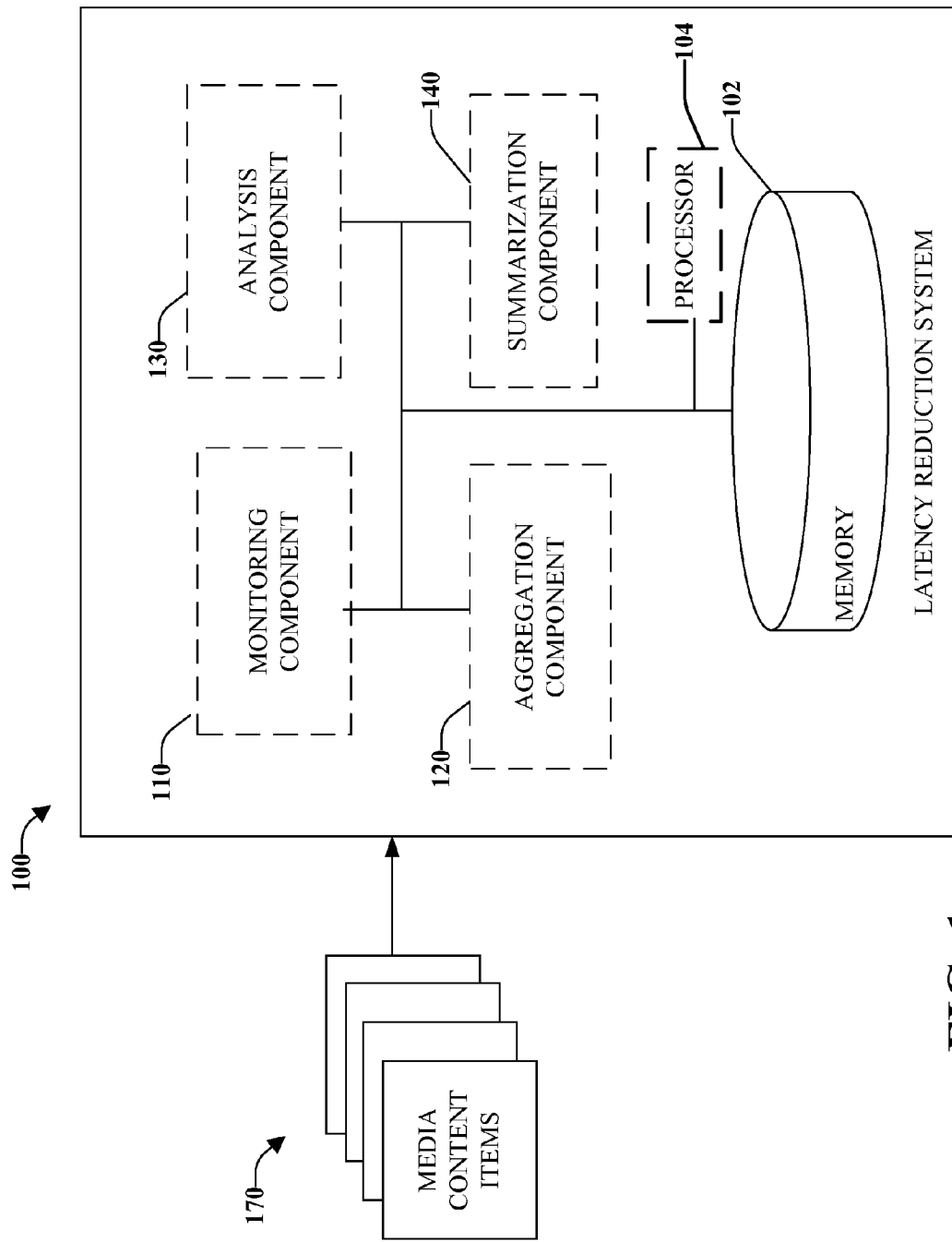
FIG. 1 illustrates an example non-limiting system for sessionizing log events and reducing latency time.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and components are shown in block diagram form in order to facilitate describing the innovation.

By way of introduction, the subject matter disclosed in this disclosure relates to a system for reducing the latency time for sessionizing log events from a streaming log event source. Often when a user consumes media content such as a video, the video hosting website maintains a log of user interactions with respective videos. The log stores information about the user interactions also known as events. An event can be the stopping of a video, the viewing of a video, the pausing of a video, searching through a video, rewinding a video, and other such user interactions with a video. After logging such events, the events are then stored on a server and analyzed for relevant information that is useful for enhancing user experience.

For instance, if most users are only viewing segment 02:01 to 03:45 of a streaming video, then it may be useful to cache that segment for quicker user viewing experience or to affix an advertisement to such segment because advertisements at other segments are less likely to be viewed by most users. Due to usefulness of log event data, it is desirable that such event data be monitored, aggregated, analyzed, and summarized in a timely manner. Unfortunately, logging of event data typically allows for logging of limited information, such as number of users viewing a particular video at various time intervals during the course of the video. Thus, for example, 2,000 users can be logged as watching a particular video at 00:30 data point, 4,000 users can be logged as watching the same video at 00:45 data point, and so forth. This log event data is captured within a specific time window and the time window encompasses time latency associated with the logsaving activity, user inactivity (e.g. a user watching long segments of video without actively using the computer), and other such variables.

Furthermore, log event data relating to user abandonment of viewing a video is not available. Thus, log event data captured within a time interval is often employed to infer user abandonment of video viewing. The disclosed latency reduction system allows for log event data to be monitored, aggregated, analyzed, and summarized at a greater frequency than conventional systems (e.g., that can require up to 24 hours to log data), and thus improve freshness or relevancy of log data. Event logging latency reduction can result in at least the following benefits: greater user video watching experience, efficacious advertisements, and quick global reactions to new popular trends.

Example System for Sessionizing Log Events from a Streaming Log Event Source and Reducing Latency Referring now to the drawings, with reference initially to FIG. 1, a latency reduction system 100 is shown that facilitates reducing latency time associated with summarizing log events from a streaming log event source. Aspects of the systems, apparatuses or processes explained in this disclosure can constitute machine-executable component embodied within machine(s), e.g., embodied in one or more computer readable mediums (or media) associated with one or more machines. Such component, when executed by the one or more machines, e.g. computer(s), computing device(s), virtual machine(s), etc. can cause the machine(s) to perform the operations described. Latency reduction system can include memory 102 for storing computer executable components and instructions. A processor 104 can facilitate operation of the computer executable components and instructions by the access control system 100.

In an embodiment, latency reduction system 100 employs a monitoring component 110, aggregation component 120, analysis component 130, and a summarization component 140. Monitoring component 110 monitors watch time event data related to user consumption of media content items 170 (e.g. audio content, video content, image content, . . . ). Aggregation component 120 aggregates the watch time event data. Analysis component 130 analyzes respective watch time event data based at least in part on user playback of the media content items 170. Summarization component 140 summarizes the pending and finalized watch time event data into a finalized playback record.

The media content items 170 monitored by monitoring component 110 can include media data associated with one or more data sources (not shown) that can be accessed by latency reduction system 100 (and additional systems described in this disclosure). For example, a data source can include a data store storing media content and affiliated with a content provider that interacts with the latency reduction system 100. In another aspect, a data source can include a data store that stores media content remote from a content provider or a latency reduction system 100. In an aspect, media content items 170 can include media data as media items. For example, the media content items 170 can include one or more media items (e.g., video and/or audio including but not limited to movies, television, streaming television, video games, music tracks . . . ). In an aspect, the media content items 170 are at least one of a movie item, audio item, image item, or digital print item (e.g. newspaper, blog, on-line magazine, etc.).

In an aspect, monitoring component 110 monitors event data related to user consumption of media content items 170. Event data reflects one or more media content item 170 events generated by at least one hosted media content item 170. The event data can be presented in reports to an administrator that can be organized into data formats, such as code, graphs, charts, and other such information formats. Further, event data can provide insights into login activities, user usage of a media content item 170, geographic location from which the media content 170 is accessed, and type of user device the media content item 170 is accessed from.

According to an embodiment, monitoring component 110 monitors event data related to user consumption of media content items 170. User consumption refers to interaction between a user and media content items 170. For instance, with regards to a video or audio file, a user can play, fast forward, rewind, pause, record, or view in slow motion the file. Additionally, a user can embed the file, share the file over a network (e.g. social network), click on an advertisement embedded within the file, or edit the file. Furthermore, each monitoring component 110 maintains a log of user interactions. The log stores information about user events (e.g. event data). Monitoring component 110 monitors such event data related to these user interactions with media content items 170. In an aspect, monitoring component 110 identifies a user interest in a video by capturing relevant data such as number of users viewing a video (e.g. video page views, video views) at respective time intervals; total number of hours a video is viewed; drop off rate in which user views begin to decrease at a certain point; when respective users view, stop viewing, forward, rewind a video; or other such relevant data.

In another embodiment, aggregation component 120 aggregates event data into groups based on specific variables. In an aspect, the aggregation component 120 gathers information identified by monitoring component 110 and organizes the information for purposes of analysis and summary. For instance, the aggregation component can take the information related to total number of video views for an event between 00:31 to 01:00 and an event between 01:01 and 01:30 in a video and organize the information into an overall total number of video views by users. Furthermore aggregation component 120 can aggregate subtotals by variables such as users within a specific geographic location, users whom view intermittent portions of video, users of an age group, users belonging to a particular gender and other such user variables.

In another aspect, aggregation component 120 aggregates event data into groups that order the event data in an organized manner. The order can vary depending on how data was received by the data source or monitoring component 110. For instance, monitoring component 110 can identify large mixtures of event data without sorting such information into buckets or groupings. Thus aggregation component can aggregate and change the order in which the event data was received from monitoring component 110 in a manner that is more useful for analysis. For example, event data related to all drama videos viewed can be aggregated and grouped in alphabetical order or from highest to lowest popularity. In this way, aggregation component 120 organizes and learns large volumes of data in order to create a more manageable analysis and summarization of the event data. Furthermore, the aggregation component 120 can aggregate information by browsing digital libraries, data stored in set-top boxes, data stored in mobile devices, media content 170 hosting websites or other such locations.

In an embodiment, an analysis component 130 analyzes respective event data based at least in part on user playback of the media content items 170. In an aspect, an analysis component 130 analyzes event data related to user playback. User playback refers to user interaction with the video such as play, pause, forward, rewind as well as interactions with a hosting site such as search, changing a page, accessing links, tagging, sharing, embedding, and other such user interactions. In an aspect, analysis component 130 analyses event data by labeling log events related to playback. For instance, analysis component 130 can label specific log events as positive or negative to designate positive interaction between a user and a media content item 170 or negative interaction between a user and a media content item 170. A positive interaction may be designated if a user views a video for three minutes uninterrupted or if a user clicks on an advertisement. A negative interaction may be designated for a video time interval that demonstrates a steep drop-off of user views.

In order to analyze event data, such as positive interactions, the analysis component 130 can analyze a specific subset of data that meets certain conditions. For instance, analysis component 130 can employ filters to select specific information. Furthermore, analysis component 130 can analyze event data within a time window, which is a means to establish a time interval for analysis. The time window represents an interval for analyzing co-occurring event data within a particular video or among specific videos. Furthermore, the time window can be implemented with either a fixed time length or a variable time length. For instance, in an aspect, the time window size can be one hour so that only videos viewed within one hour of each other are analyzed for positive interactions. Often, users view multiple videos in a given time span and the content varies from the first video viewed to the last video viewed within the time span. Thus by using a smaller time window interval (e.g. one hour window), there is an increased likelihood that the videos viewed by a user within that interval are related to one another. The time window can be adjusted to suit different event data analysis purposes, to facilitate summarization of event data, and to reduce latency time associated with analyzing related event data. In an aspect, the analysis component 130 can analyze various types of event data such as page views, video views, hours views, or video engagement information.

In another embodiment, summarization component 140 summarizes pending and finalized event data into a finalized playback record. In an aspect, event data that is monitored, aggregated, and analyzed (in no particular order) can be summarized into useful information such as whether a video is increasing sales, increasing return on investment, increasing awareness depending on the purpose of the video, performing at a satisfactory quality level and other such information. In an aspect, summarization component 140 can build a report which in itself can comprise multiple sub-reports to be arranged in numerous configurations and formats (e.g., charts, graphical representations of data or data sets, trend lines, meter charts, etc.). The summarization component 140 can summarize complex event data into an easily interpretable format. Furthermore, summarization component 140 can summarize user geographic information (e.g. location from which a user accesses a video) and a variety of information types.

In an aspect, event data is either pending or finalized in that pending event data is data received from a time window that has not yet reached the interval end point. Further, pending event data also refers to data that has not yet been fully monitored, stored, aggregated, or analyzed due to the latency associated with such processes. Finalized event data is data that has been fully monitored, aggregated, and analyzed within a completed time window interval. The summarization component 140 in connection with the analysis component 130 sorts pending and finalized event data in categories that attribute respective event data to respective finalized playback records. When event data is received by the aggregation component 120, the respective data is not arranged in a manner that associates playback events with a particular user, a particular video or a particular order of events. Thus, summarization component 140 in connection with the analysis component 130 arranges the information into a meaningful chronology or categorization to facilitate finalization of a playback record.

A finalized playback record refers to the completion of a playback history including associated event data. For instance, a finalized playback record can capture historical information related to a media content item 170. Furthermore, the finalized playback record can comprise data that totals the number of viewers that consumed a video (e.g at various data points) as well as compartmentalizing viewer data belonging to a respective viewer. Thus a finalized playback record can indicate whether user A played a video at 00:00, stopped the video at 03:20, rewound the video at 05:04, watched an advertisement at 03:45 and so forth. Furthermore, the finalized playback record can identify the number of users viewing a video at various video intervals within a time window. For instance, the finalized playback record can indicate that within a time window of one hour 4,500 users viewed a video from 01:25 to 02:25, 5,000 users viewed the video from 02:26 to 3:25, and so forth.

In an aspect, summarization component 140 summarizes such information in order to determine and generate useful information related to video analytics. A summary of video analytics can provide insights to users, hosting agents, content distributors, advertisers and others regarding information including, but not limited to, number of users that click to play a video, number of times a particular user hits play on a particular video (e.g., video view), ease of identification of the video, number of video page views (e.g., number of times a user loads a page where the video is located which doesn't necessitate layering the video), or ratios such as number of video views to page views to determine if a page layout is optimized. Also summarization component 140 can summarize the number of hours a video is viewed by multiplying the number of users who viewed a video by the number of minutes each user viewed the video. For instance, if 30 users viewed a particular video, and each user viewed the entire 5 minute video then total hours viewed equals 2.5 hours (30 users×5 minute video=2.5 hours viewed). Summarization component 140 can also summarize viewer drop off information, such as video data indicating the interval whereby viewers drop off from viewing a video or indicating specific video segments whereby users replay video content. These final playback record summaries can help make advertising more effective, contribute to clipping and editing videos, or better understand quality of user experience.

In a non-limiting implementation, latency reduction system 100 manages to lower latency time associated with monitoring, aggregating, analyzing, and summarizing event data by implementing a particular criteria to finalize a playback record. A record is finalized if T+L+I<current wall time. In this equation, T=event time of the last event of a playback. L=Logsaver latency. L refers to time delay associated with saving log events, which in practice is about 30 minutes at about 99% percentile. I=Inactivity threshold. The I threshold to finalize a record occurs after there is "inactivity" regarding the video for approximately 30 minutes. Current wall time is the time period for performing logging. Thus, a wall time that exceeds T+L+I allows for finalizing a playback and initiating another logging session. Thus, if T=5:00 am, L=30 minutes, and I=30 minutes and the current wall time is 5:30 am, then a playback record will not be finalized by system 100 because T+L+I>current wall time. However, if T=7:00 pm, L=60 minutes, and I=30 minutes, current wall time is 10:00 pm then the playback record will be finalized because T+L+I<current wall time. Customarily, a large number of false positives are generated due to logsaver latency, whereby after a session is finalized more records are generated associated with the finalization playback due to the slow speed of the logsaver. However, the criteria T+L+I<current wall time, accounts for logsaver latency thereby ensuring a smaller number of false positives generated by the summarizer. Additionally, this criteria significantly reduces latency time in that playback records will be finalized at a greater frequency (e.g., multiple times per day) rather than the conventional finalization of playback records of once every 24 hours.

This dramatic reduction in latency time across a finalization pipeline allows for generation of more fresh/relevant and frequent user analytics, faster reactivity to event data, generating continuous data throughout the day, publishing fresh data throughout the day, sending data to regions of the world where information can be used to edit media content items 170, and advertisement modification or replacement. Latency reduction system 100, unlike older technologies, can monitor, aggregate, analyze, and summarize pings for a user at greater frequency (e.g., sets of seconds, minutes, hours . . . ) as compared to over an entire day per batch process associated with conventional implementations. Accordingly, playback record finalization criteria is also dynamically adjustable whereby current wall time can be made larger or smaller in order to summarize event data in smaller periods of time and with greater frequency. Therefore, the wall time can be tailored or fitted to coincide with latency associated with logsaving in order for the latency reduction system 100 to automatically or dynamically react to network slowdowns and other factors that inhibit speed of content delivery.

Figure 2:
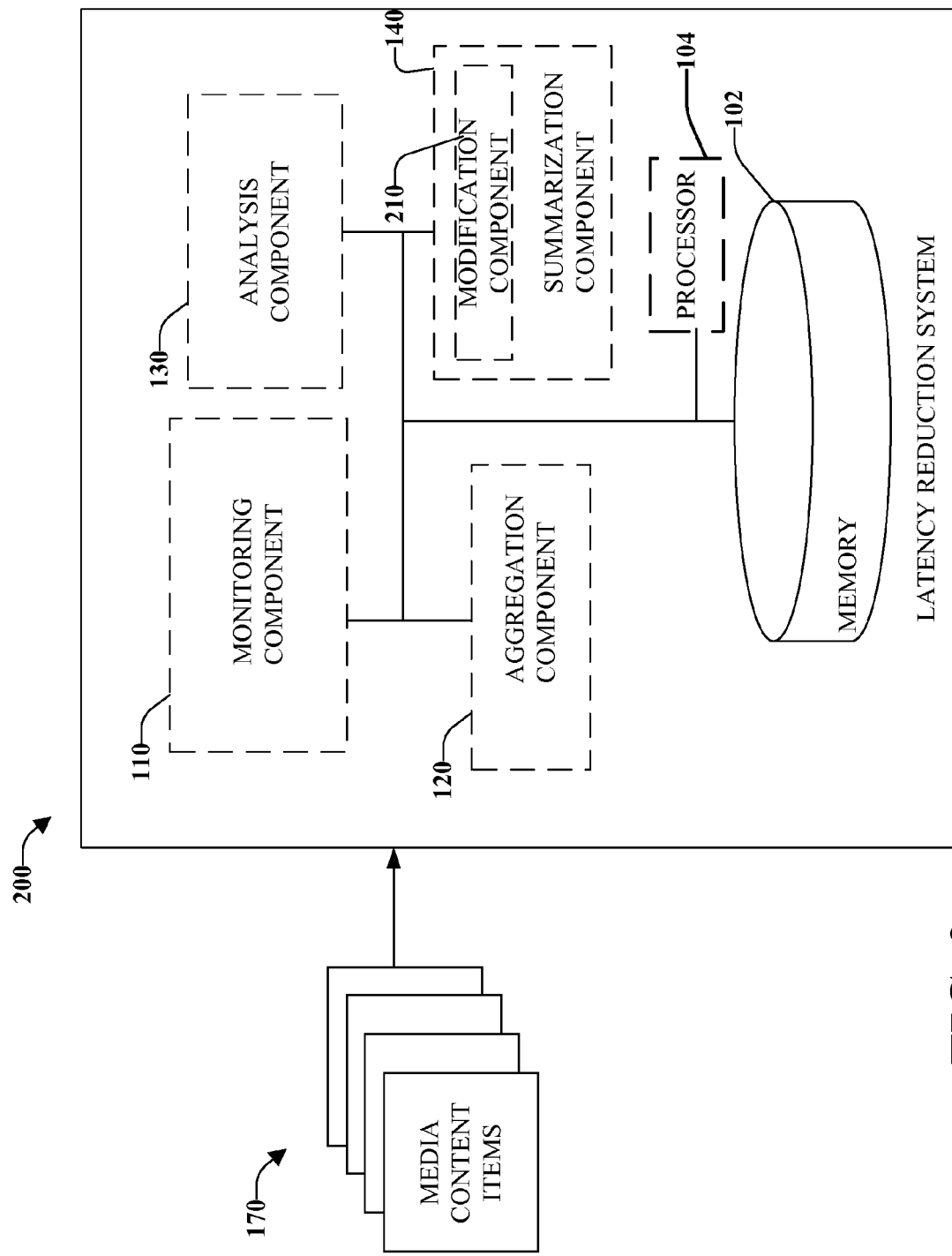
FIG. 2 illustrates an example non-limiting latency reduction system for modifying information, data, and statistics disseminated to users in different time zones.

Turning now to FIG. 2, presented is another non-limiting embodiment of latency reduction system 200 in accordance with the subject of the disclosure. In an aspect, summarization component 140 employs modification component 210 that modifies information, data, and statistics disseminated to users in different time zones. Summarization component 140 summarizes information, data, and statistics related to event data and media playback. In an aspect, summarization component 140 summarizes statistics related to media content items 170 and event data. For instance, summarization component 140 can summarize and generate statistics based on the mean, the median, the standard deviation, the quartiles, the sum and other statistical metrics related to finalized playback information and event data (e.g. the mean of total views for the duration of an entire video).

In an aspect, summarization component 140 employs modification component to modify information, data and statistics. Thus if the statistics demonstrate that the greatest number of viewers view segment 01:25 to 02:00 of a video, but all advertisements embedded in the video are front loaded in segment 00:30 to 00:59 then the advertisement can be relocated to the 01:25 to 02:00 segment in order to capture more viewers. Furthermore, modification component 140 can modify information, data, and statistics disseminated to users in different time zones. For example, if the viewer information related to video segment 01:25 to 02:00 viewership is learned in London at 10:00 am, modification component 140 can modify and relocate the advertisement to segment 01:25 to 02:00 for dissemination to viewers residing in the United States Eastern Standard Time zone before they wake up in the morning. In an aspect, modification component 140 can modify information, data, and statistics in order to keep media content items 170 fresh, up to date, in accordance with user preference, and relevant for viewers located in different regional time zones.

Figure 3:
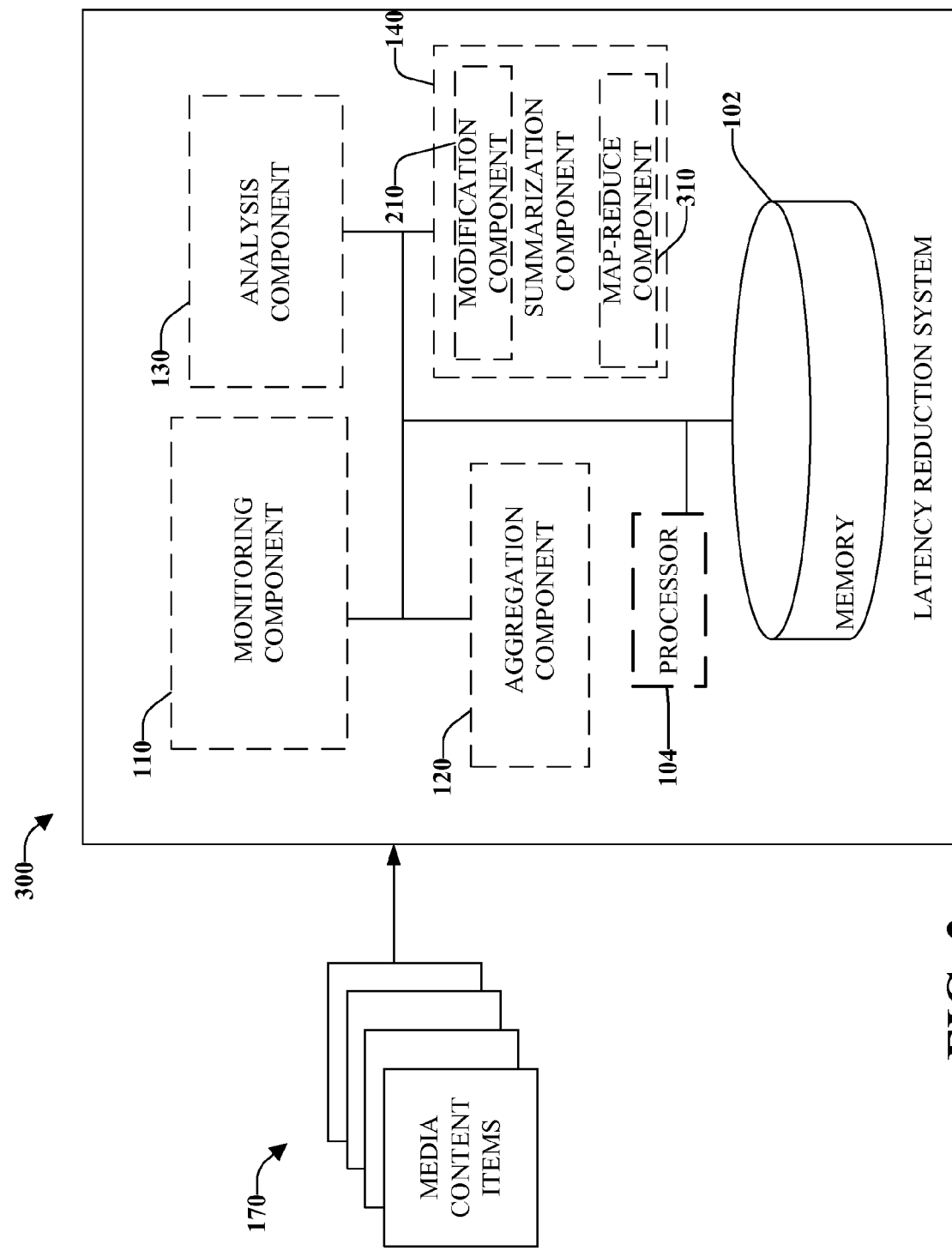
FIG. 3 illustrates an example non-limiting latency reduction system for producing pending and finalized records.

Turning now to FIG. 3, presented is another non-limiting embodiment of latency reduction system 300 in accordance with the subject of the disclosure. In an aspect, the summarization component 140 employs map-reduce component 310 that partitions events into data sets to be processed on different machines to produce the pending and finalized playback record. Although various embodiments are described herein within context of employing map-reduce, it is to be appreciated that map-reduce is simply one example technique that can be employed, and the disclosed subject matter can employ any suitable technique to implement the functionality described herein in connection with map-reduce. In an aspect, latency reduction system 300 monitors, aggregates, analyzes, and summarizes large sets of event data that require complex processing mechanisms to support the large quantities of data. Summarization component 140 can employ map-reduce component 310 to reduce the processing burden by partitioning event data into data sets for processing on different computer machines. The distribution of data sets onto a collective of computers connected via a cluster or a grid allow for more manageable amounts of event data to be mapped and processed.

In an aspect, map-reduce component 310, employed by summarization component 410 produces pending and finalized playback data from large sets of event data by mapping and reducing the event data. The mapping process divides large sets of input event data into a large number of computers connected in a multi-level structure. The computers situated at a higher tier break down data problems into sub-problems and passes the sub-problems to computers situated at lower tier levels. The lower tier computers process the smaller problems and pass the solution to the higher tier computers. This distributive processing structure allows for smooth parallel processing operations of large sets of information in an efficient manner which ultimately leads to reduced latency issues associated with parallel processing. Furthermore, by partitioning data into manageable data sets, map-reduce component 310 via summarization component 140 produces pending and finalized playback records useful for user analysis.

Figure 4:
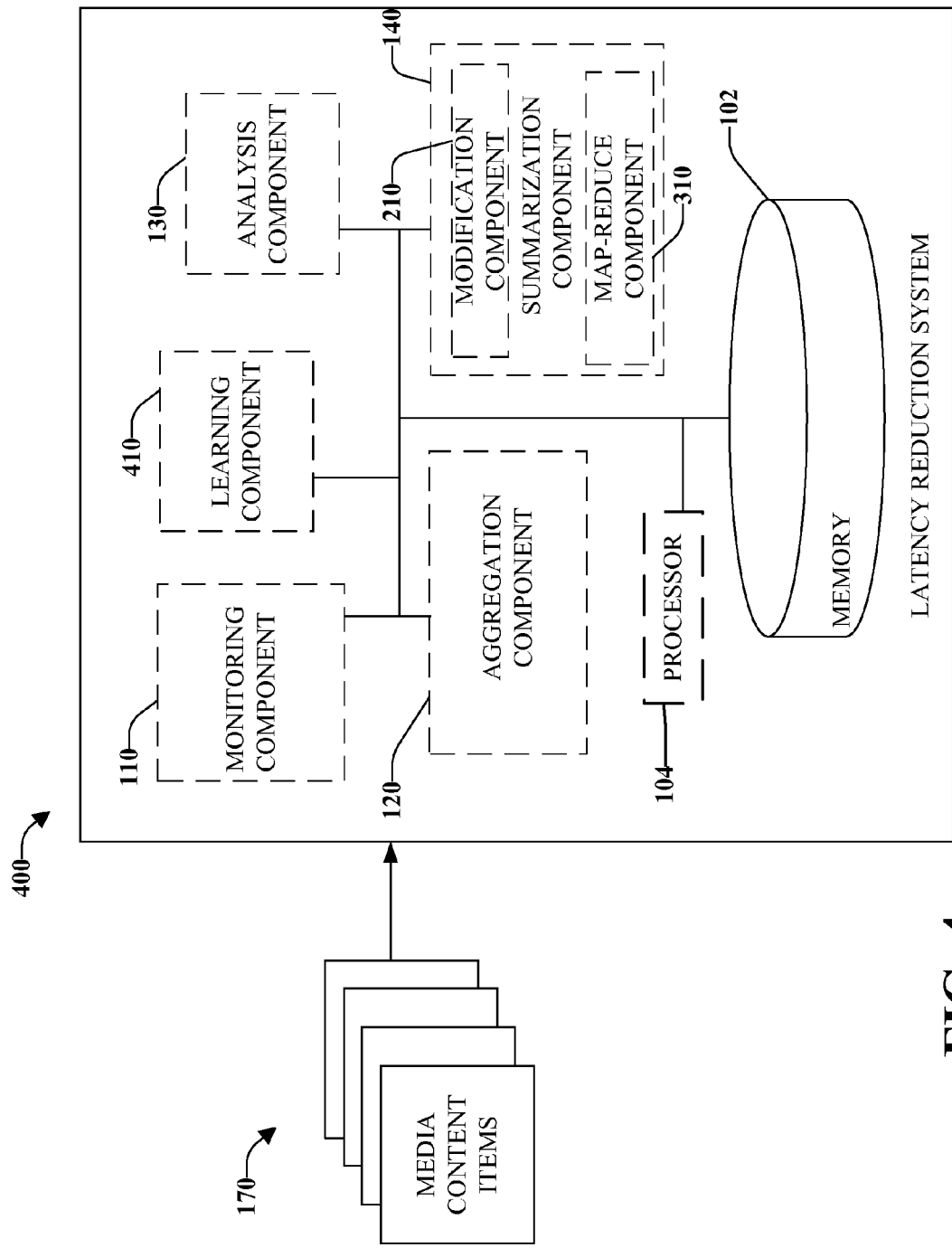
FIG. 4 illustrates an example non-limiting latency reduction system for partitioning watch time events into data sets to be processed on different machines.

Turning now to FIG. 4, presented is another non-limiting embodiment of latency reduction system 400 in accordance with the subject of the disclosure. In an aspect, learning component 410 provides timely trending information within a confidence level based in part on summarized event data received from the summarization component 140. Often when a large number of users consume particular media content item 170 within a short period of time, the particular media content item 170 can be considered to have gone viral, whereby there is a significant quantity of user interest and mass popularity in the particular media content item 170. Accordingly, many media content items 170 don't go viral, but do attract a great deal of attention by users throughout the day, such media items 170 are known to be trending. A video about a popular celebrity, world event, sports result, business opportunity, or entertainment event are all potential topics for trending.

Learning component 410 can provide timely trending information within a confidence interval based in part on summarized event data received from summarization component 140. In an aspect, learning component 410 can use summarized event data to determine attributes, types, segments, and formats of event data that are popular to users. Furthermore, due to the reduced latency time accomplished by latency reduction system 400, the trending information will be more current and indicative of recent events rather than comprehending trends at the end of each day. Also, in order to confirm reliability of the summarized data (e.g. to confirm that event data associated with a media content item 170 is actually trending), learning component 140 can make use of summarized event data within a specific confidence interval (e.g. 95%).

Figure 5:
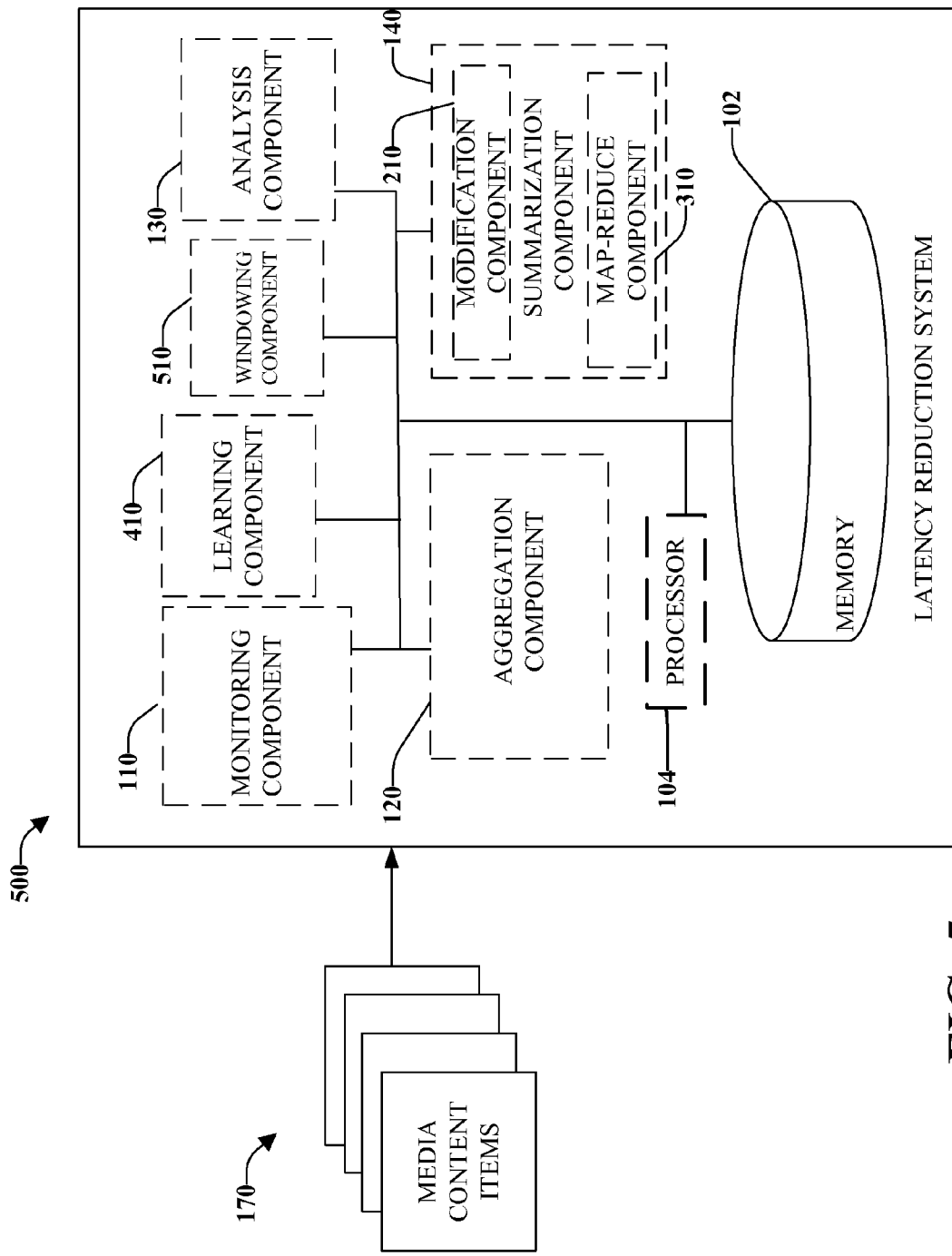
FIG. 5 illustrates an example non-limiting latency reduction system for providing timely trending information within a confidence level.

Turning now to FIG. 5, presented is another non-limiting embodiment of latency reduction system 500 in accordance with the subject of the disclosure. In an aspect, windowing component 510 adjusts the size of a time window based in part on observed logsaver latency. Observed logsaver latency is the actual latency time required to save event data as opposed to a predicted value of expected latency time. Logsaver latency can significantly slow down logging of event data often due to burdens associated with allocating and initializing a large quantity of memory to the log task. In an aspect, windowing component 510 can adjust the time window which helps reduce the time consuming act of saving logged event data. The windowing component 510 can adjust the time window to capture event data after a logsaving process takes place.

This approach to customizing time windows can mitigate or prevent a traffic jam of too much event data being saved at one time due to a compounding of log saving activities. Instead windowing component 510 can adjust the window time to allow for new log saving activities only after the preceding log saving activity is complete. Furthermore, the ability of windowing component 510 to adjust window time to a smaller interval allows for saving of smaller amounts of data several times a day rather than one voluminous set of data once a day thereby making the logsaving process more efficacious. Additionally, because the windowing component 510 accounts for observed logsaver latency, the windowing adjustment can be based on an actual not predicted value which further enhances the accuracy, lowers time wastage, and furthers the efficacy of the logsaving process.

Figure 6:
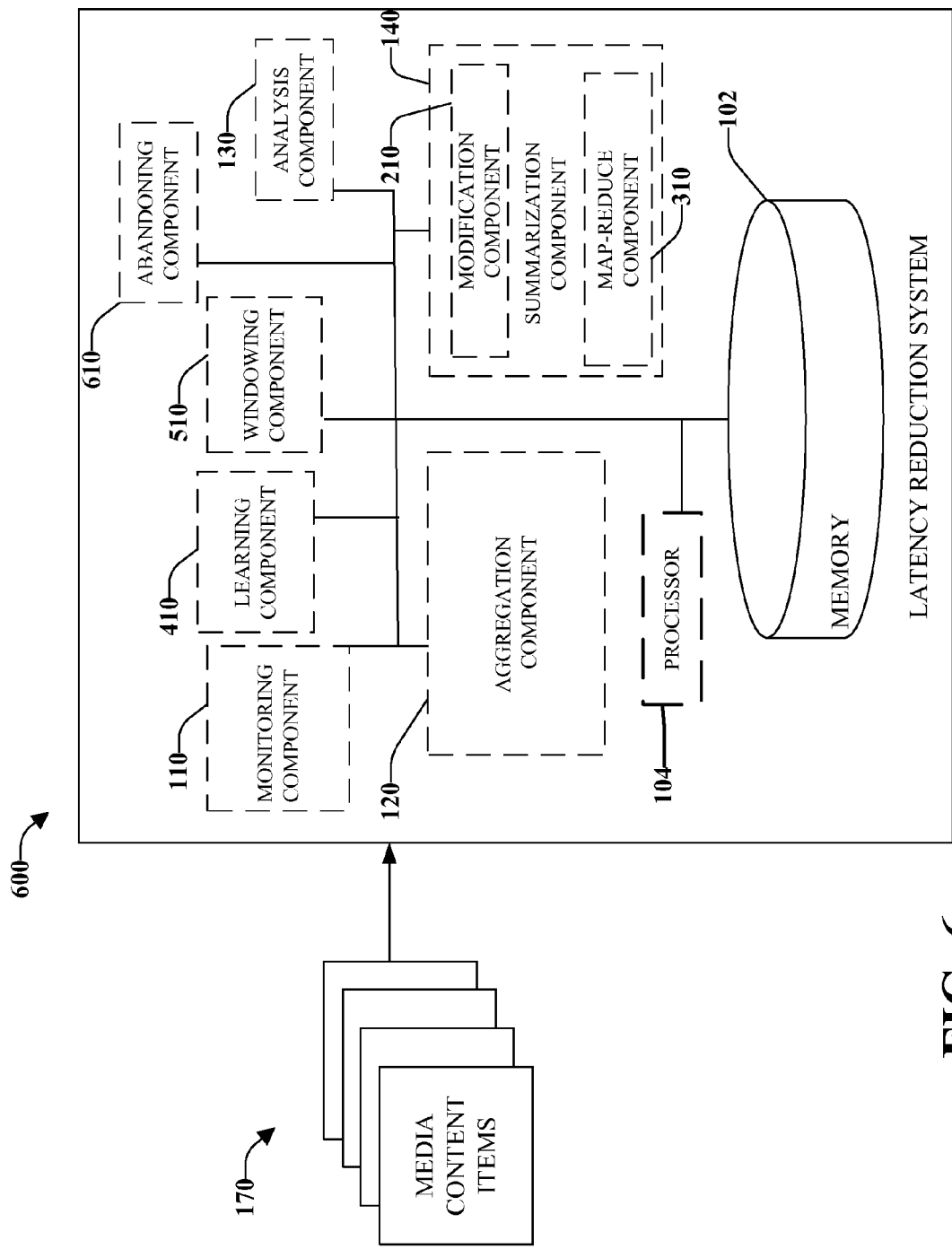
FIG. 6 illustrates an example non-limiting latency reduction system for adjusting the size of a time window based in part on observed logsaver latency.

Turning now to FIG. 6, presented is another non-limiting embodiment of latency reduction system 600 in accordance with the subject of the disclosure. In an aspect, abandoning component 610 upon at least one of: completion of playback, user closing of a tab or window, or user navigation sends collected event data. In an aspect, latency reduction system 600 continuously logs event data at various time intervals in an order that enables inferring a users abandonment from consuming a media content item 170. For instance, latency reduction system 600 can infer that at least some users abandoned viewing a video if at 00:25, 4,000 users viewed a video, but at 01:00, 1,000 users viewed a video. Clearly, this process of inferring user abandonment is often inefficient, unreliable, unspecific and time consuming.

In an aspect, abandoning component 610 can send collected event data for logging upon any of: completion of playback, a user closing a tab or window, or closing of a users navigation. Abandoning component, 610 allows the sending of data upon an activity that is directly associated with abandoning consumption of a media content item 170 as opposed to other mechanisms whereby abandonment must be inferred from an activity. Where a user completes playback (e.g. stops playing a video), closes out a tab or window (e.g. closes a website where a video is hosted), or closes navigation (e.g. closes a browser), the abandoning component 610 affirmatively sends the abandonment information for logging. In an aspect, abandoning component 610 facilitates a more accurate, precise, and efficient logging of events.

Figure 7:
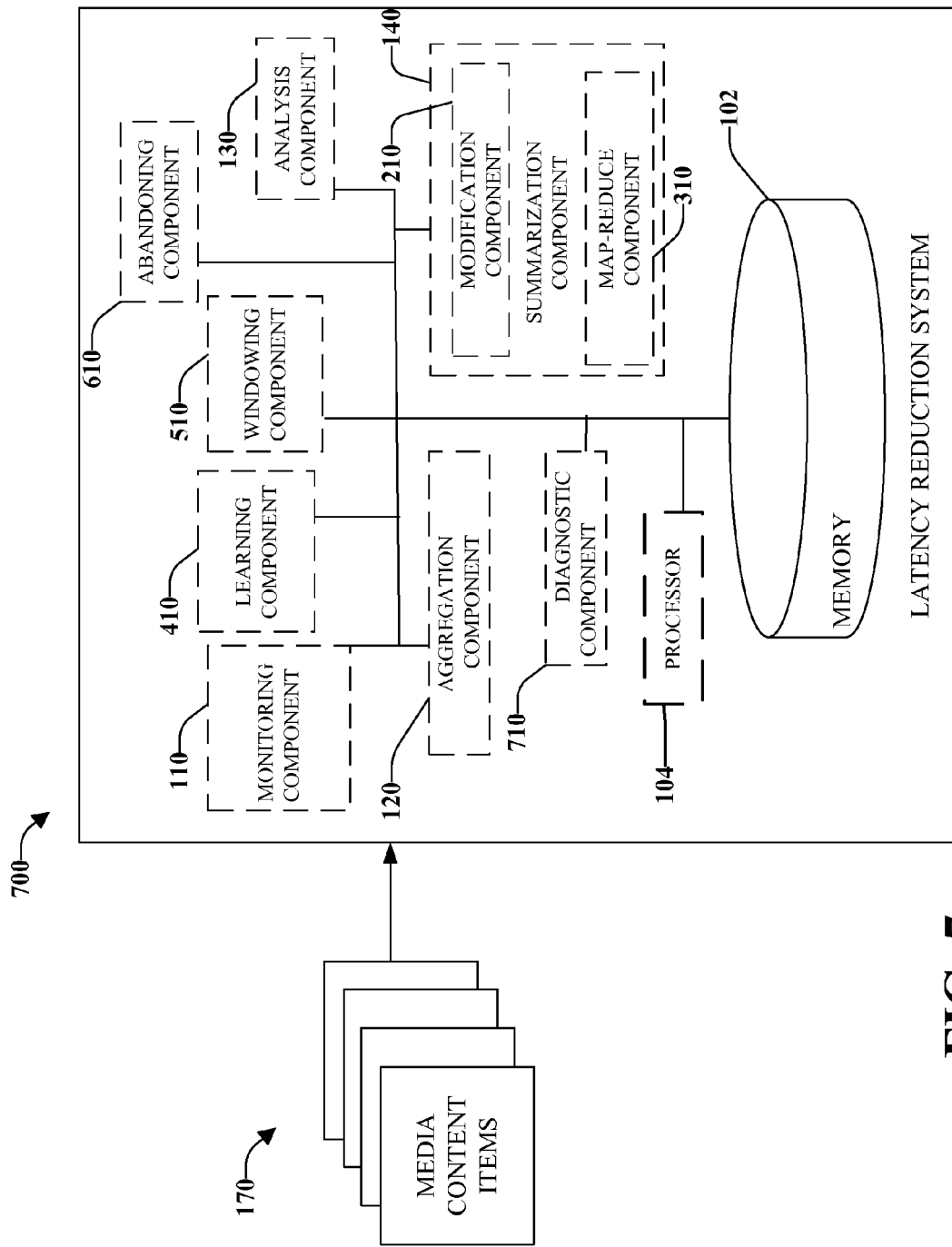
FIG. 7 illustrates an example non-limiting latency reduction system for sending watch time information.

Turning now to FIG. 7, presented is another non-limiting embodiment of latency reduction system 700 in accordance with the subject of the disclosure. In an aspect, diagnostic component 710 automatically diagnoses network slowdowns and computer effects that slow media content delivery. Another aspect, that contributes to latency in logging events are issues related to delivering media content items 170 to a user thereby affecting event data distribution and collection. Network slowdowns can be caused by disparities in round trip times (RTT) experienced by users on wireless broadband networks versus cable or fiber optics; the HTTP request-response protocol which can cause latency as a result of processing one request per connection; the TCP protocol due to throughput impact from variable and inconsistent RTT's;

and other such network slowdown causes. In an aspect, diagnostic component 710 automatically diagnoses network slowdowns and computer effects that slow down media content delivery. The diagnostic component 710 can detect network slowdowns that cause slower media content delivery by scanning networks for viruses, investigating software incompatibilities, observing amounts of traffic related to particular media content items 170, and pinpointing locations of bottlenecks. Diagnostic component 170 can police network slowdown activities associated with media content delivery and contribute to reducing latency issues related to logging events.

Figure 8:
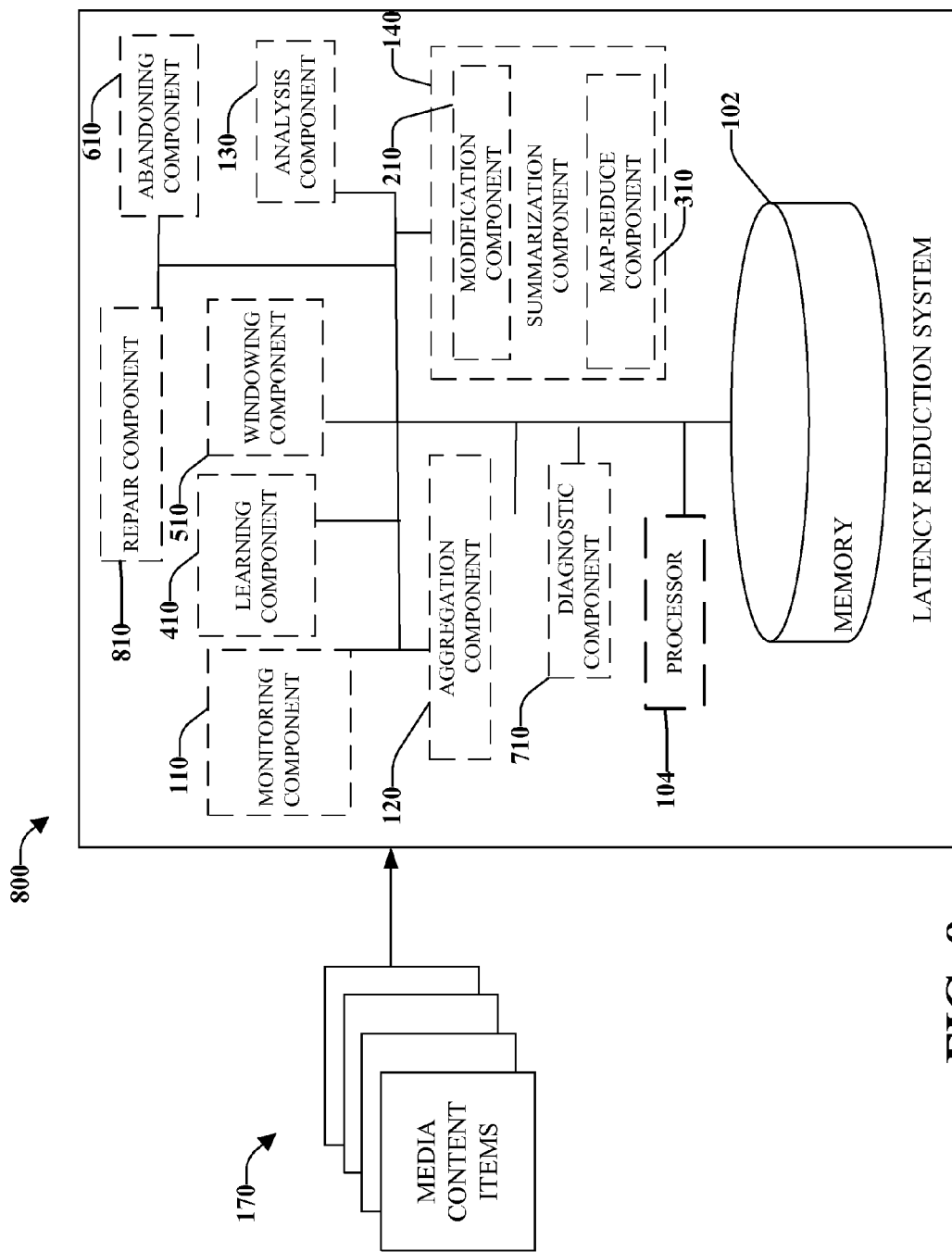
FIG. 8 illustrates an example non-limiting latency reduction system for automatically diagnosing network slowdowns and computer effects that slow media content delivery.

Turning now to FIG. 8, presented is another non-limiting embodiment of latency reduction system 800 in accordance with the subject of the disclosure. In an aspect, repairing component 810 automatically repairs network slowdowns and computer effects that slow media content item delivery. In an aspect, repairing component 810 in connection with diagnostic component 710 is capable of repairing network slowdowns that slow the delivery of media content items 170. In an aspect, repairing component 810 can attend to pinpoint locations detected by diagnostic component 710 and perform system reboots, traffic rerouting activities, parallel processing techniques and other such repairing processes to increase network slowdown for purposes of delivering media content items 170.

Figure 9:
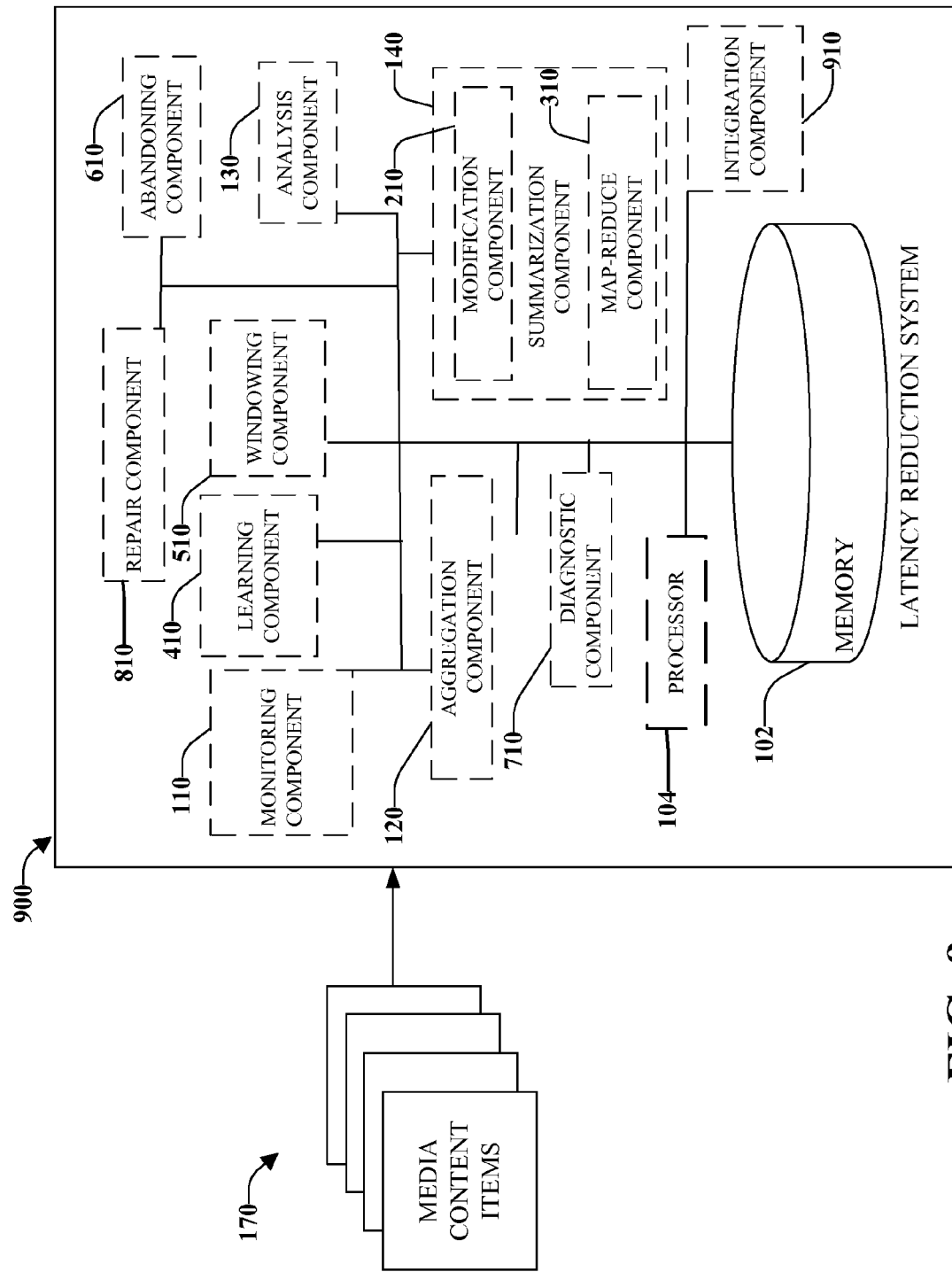
FIG. 9 illustrates an example non-limiting latency reduction system for integrating watch time data into a de-spamming pipeline.

Turning now to FIG. 9, presented is another non-limiting embodiment of latency reduction system 900 in accordance with the subject of the disclosure. In an aspect, integration component 910 can integrate watch time data into a de-spamming pipeline—watch time data can be one of many metrics fed into the de-spamming pipeline. In an aspect, latency related to logging event data can occur due to spamming which is the flooding of many copies of a message or an application "click" (often not performed by human, but rather an automated machine) which can slow down network functioning, inhibit event data logging, skew user analytics, and cause a burden to media content item 170 users. In order to suppress spamming, integration component 910 integrates data into a de-spamming pipeline in order to detect and eliminate watch time data affected by spam. In an aspect, the de-spamming pipeline can detect spam by identifying a watch time that is below a pre-determined threshold. For instance, if multiple views are detected and each is received from an automated source (e.g. false impression), the de-spamming pipeline will remove such automated view counts from the watch time data. In an aspect, integration component 910 can strengthen the integrity of the watch time data and event data that is summarized and presented to users.

FIGS. 10-14 illustrates a methodology or flow diagram in accordance with certain aspects of this disclosure. While, for purposes of simplicity of explanation, the methodologies are shown and described as a series of acts, the disclosed subject matter is not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with the disclosed subject matter. Additionally, it is to be appreciated that the methodologies disclosed in this disclosure are capable of being stored on an article of manufacture to facilitate transporting and transferring such methodologies to computers or other computing devices.

Figure 10:
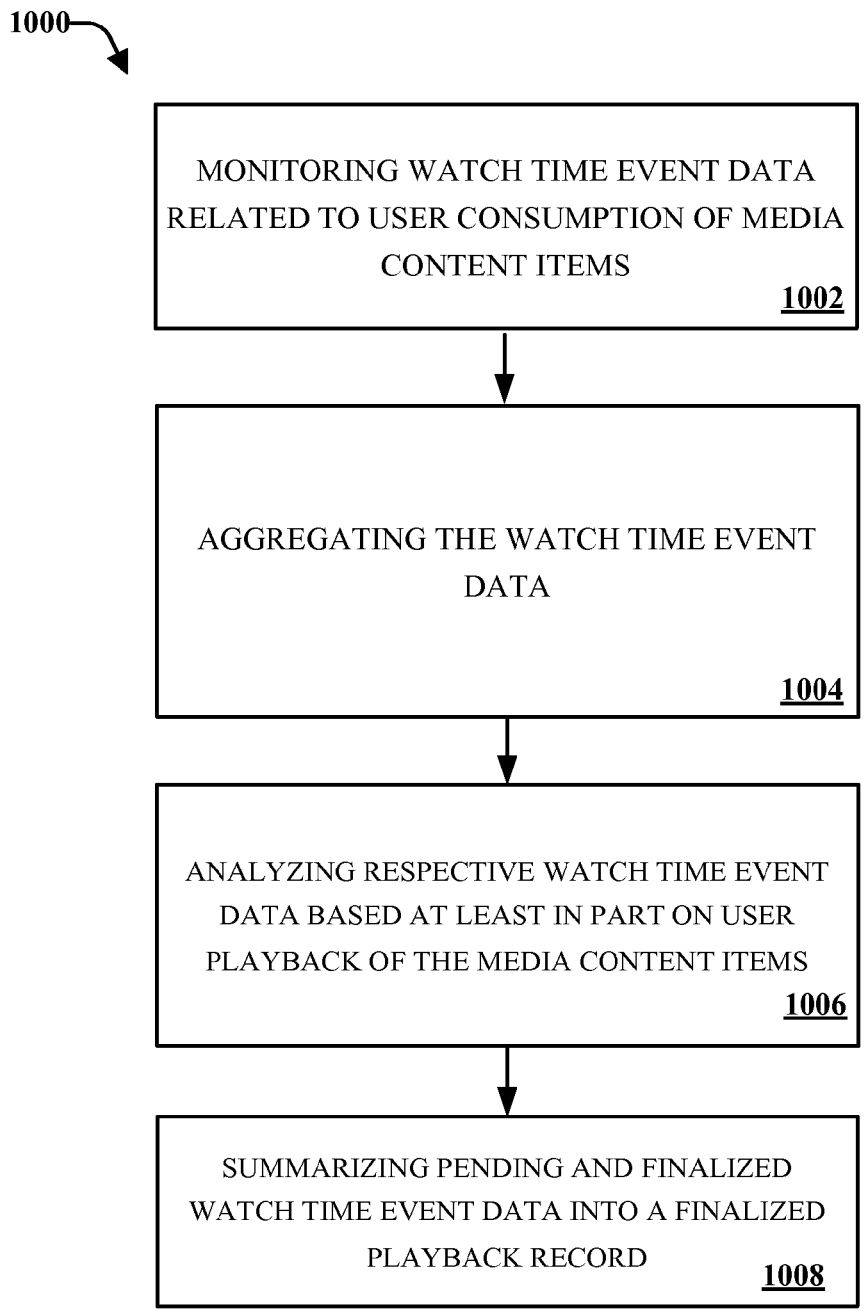
FIG. 10 illustrates an example methodology for monitoring, aggregating, analyzing, and summarizing watch time event data.

Referring now to FIG. 10, presented is a flow diagram of an example application of latency reduction system disclosed in this description in accordance with an embodiment. In an aspect, exemplary methodology 1000 of a latency reduction system is stored in a memory and utilizes a processor to execute computer executable instructions to perform functions. At 1002, latency reduction system monitors (e.g. using monitoring component 110) watch time event data related to user consumption of media content items. At 1004, latency reduction system aggregates (e.g. using aggregation component 120) watch time event data. At 1006, latency reduction system analyzes (e.g. using analysis component 130) respective watch time event data based at least in part on user playback of the media content items. At 1008, latency reduction system summarizes (e.g. using summarization component 140) pending and finalized watch time event data into a finalized playback record.

Figure 11:
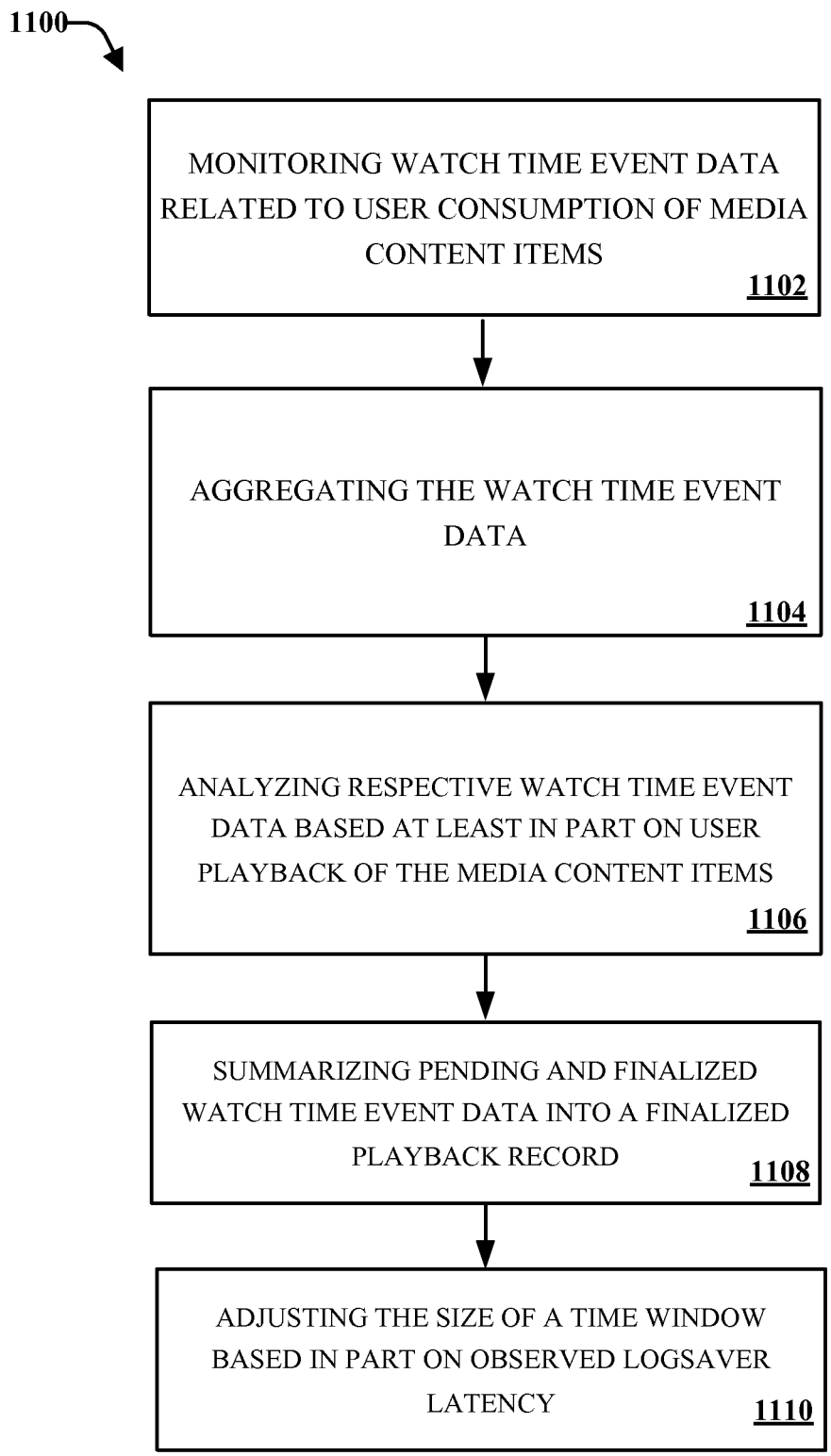
FIG. 11 illustrates an example methodology for monitoring, aggregating, analyzing, summarizing watch time event data, and adjusting a time window.

Referring now to FIG. 11, presented is a flow diagram of an example application of latency reduction system disclosed in this description in accordance with an embodiment. In an aspect, exemplary methodology 1100 of a latency reduction system is stored in a memory and utilizes a processor to execute computer executable instructions to perform functions. At 1102, latency reduction system monitors (e.g. using monitoring component 110) watch time event data related to user consumption of media content items. At 1104, latency reduction system aggregates (e.g. using aggregation component 120) watch time event data. At 1106, latency reduction system analyzes (e.g. using analysis component 130) respective watch time event data based at least in part on user playback of the media content items. At 1108, latency reduction system summarizes (e.g. using summarization component 140) pending and finalized watch time event data into a finalized playback record. At 1110, latency reduction system adjusts (e.g. using windowing component 510) the size of a time window based in part on observed logsaver latency.

Figure 12:
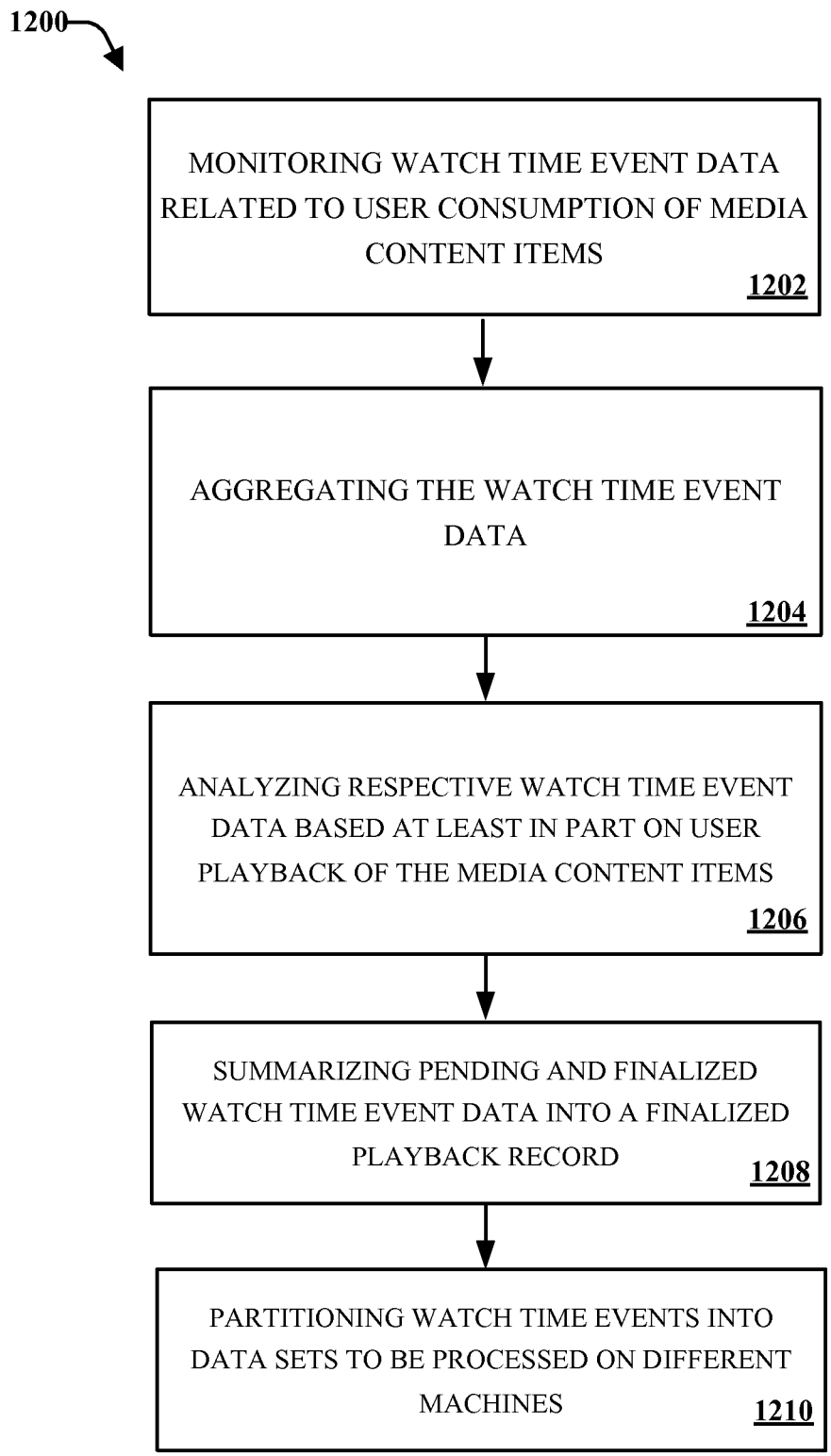
FIG. 12 illustrates an example methodology for monitoring, aggregating, analyzing, summarizing watch time event data, and partitioning watch time events.

Referring now to FIG. 12, presented is a flow diagram of an example application of latency reduction system disclosed in this description in accordance with an embodiment. In an aspect, exemplary methodology 1200 of a latency reduction system is stored in a memory and utilizes a processor to execute computer executable instructions to perform functions. At 1202, latency reduction system monitors (e.g. using monitoring component 110) watch time event data related to user consumption of media content items. At 1204, latency reduction system aggregates (e.g. using aggregation component 120) watch time event data. At 1206, latency reduction system analyzes (e.g. using analysis component 130) respective watch time event data based at least in part on user playback of the media content items. At 1208, latency reduction system summarizes (e.g. using summarization component 140) pending and finalized watch time event data into a finalized playback record. At 1210, latency reduction system partitions (e.g. using map-reduce component 310) watch time events into data sets to be processed on different machines.

Figure 13:
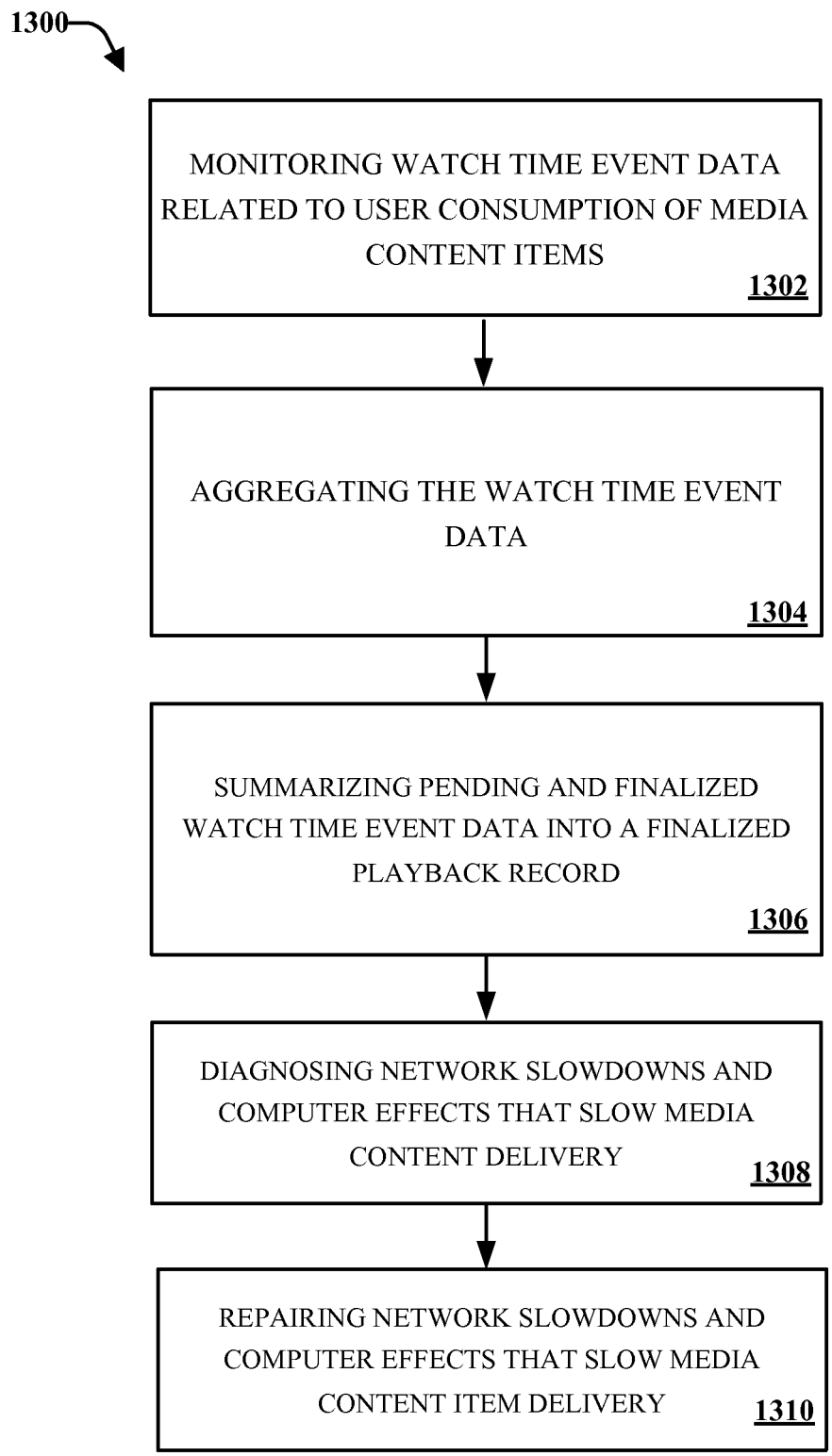
FIG. 13 illustrates an example methodology for monitoring, aggregating, analyzing, summarizing watch time event data, and diagnosing network slowdowns.

Referring now to FIG. 13, presented is a flow diagram of an example application of latency reduction system disclosed in this description in accordance with an embodiment. In an aspect, exemplary methodology 1300 of a latency reduction system is stored in a memory and utilizes a processor to execute computer executable instructions to perform functions. At 1302, latency reduction system monitors (e.g. using monitoring component 110) watch time event data related to user consumption of media content items. At 1304, latency reduction system aggregates (e.g. using aggregation component 120) watch time event data. At 1306, latency reduction system summarizes (e.g. using summarization component 140) pending and finalized watch time event data into a finalized playback record. At 1308, latency reduction system diagnoses (e.g. using diagnostic component 710) network slowdowns and computer effects that slow media content delivery. At 1310, latency reduction system repairs (using repairing component 810) network slowdowns and computer effects that slow media content item delivery.

Figure 14:
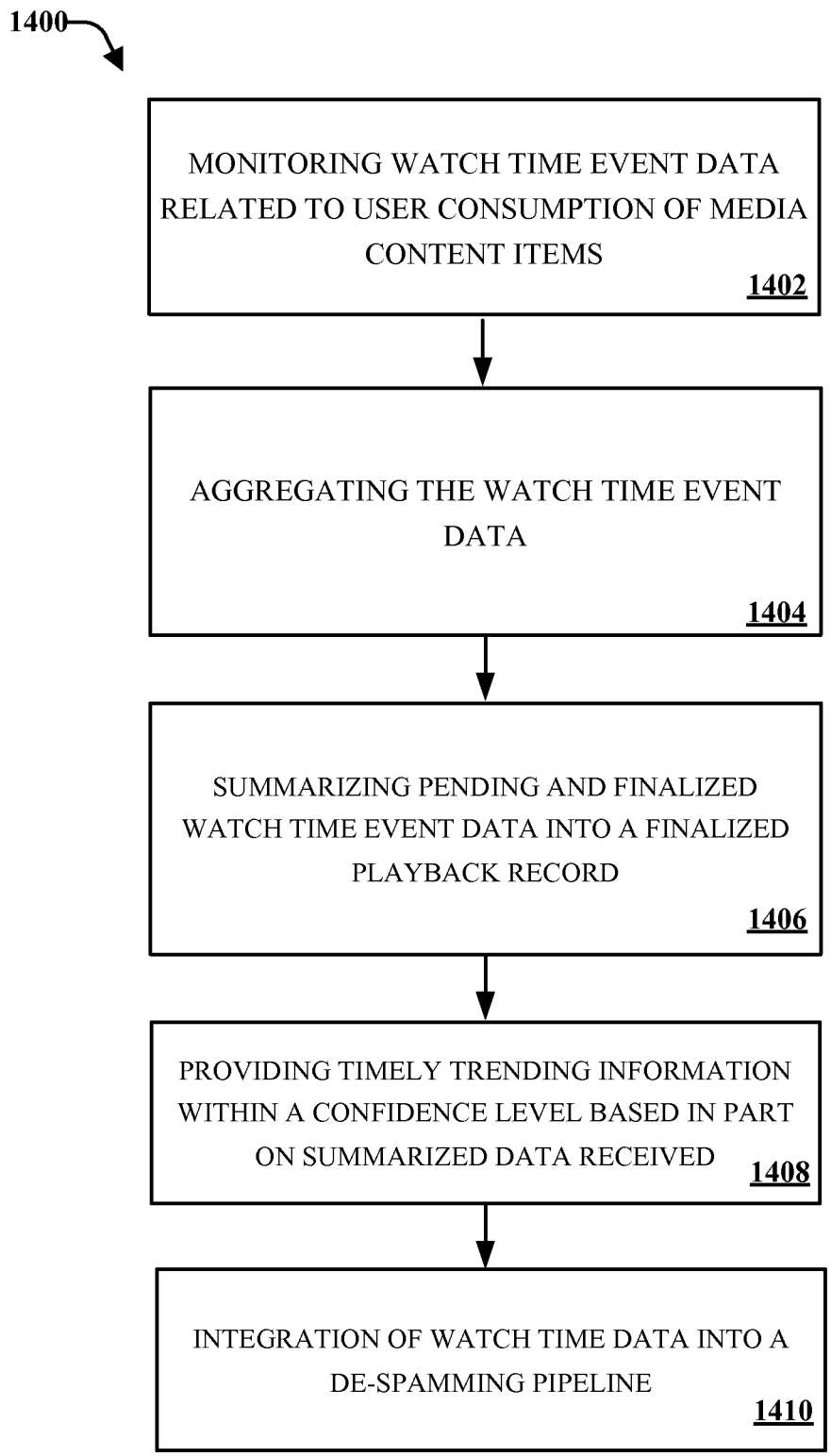
FIG. 14 illustrates an example methodology for monitoring, aggregating, analyzing, summarizing watch time event data, and integrating watch time data into a de-spamming pipeline.

Referring now to FIG. 14, presented is a flow diagram of an example application of latency reduction system disclosed in this description in accordance with an embodiment. In an aspect, exemplary methodology 1400 of a blended ranking system is stored in a memory and utilizes a processor to execute computer executable instructions to perform functions. At 1402, latency reduction system monitors (e.g. using monitoring component 110) watch time event data related to user consumption of media content items. At 1404, latency reduction system aggregates (e.g. using aggregation component 120) watch time event data. At 1406, latency reduction system summarizes (e.g. using summarization component 140) pending and finalized watch time event data into a finalized playback record. At 1408, latency reduction component provides (e.g. using learning component 410) timely trending information within a confidence level based in part on summarized data received. At 1410, latency reduction component integrates (e.g. using integration component 910) watch time data into a de-spamming pipeline.

Example Operating Environments

The systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which may be explicitly illustrated in this disclosure.

Figure 15:
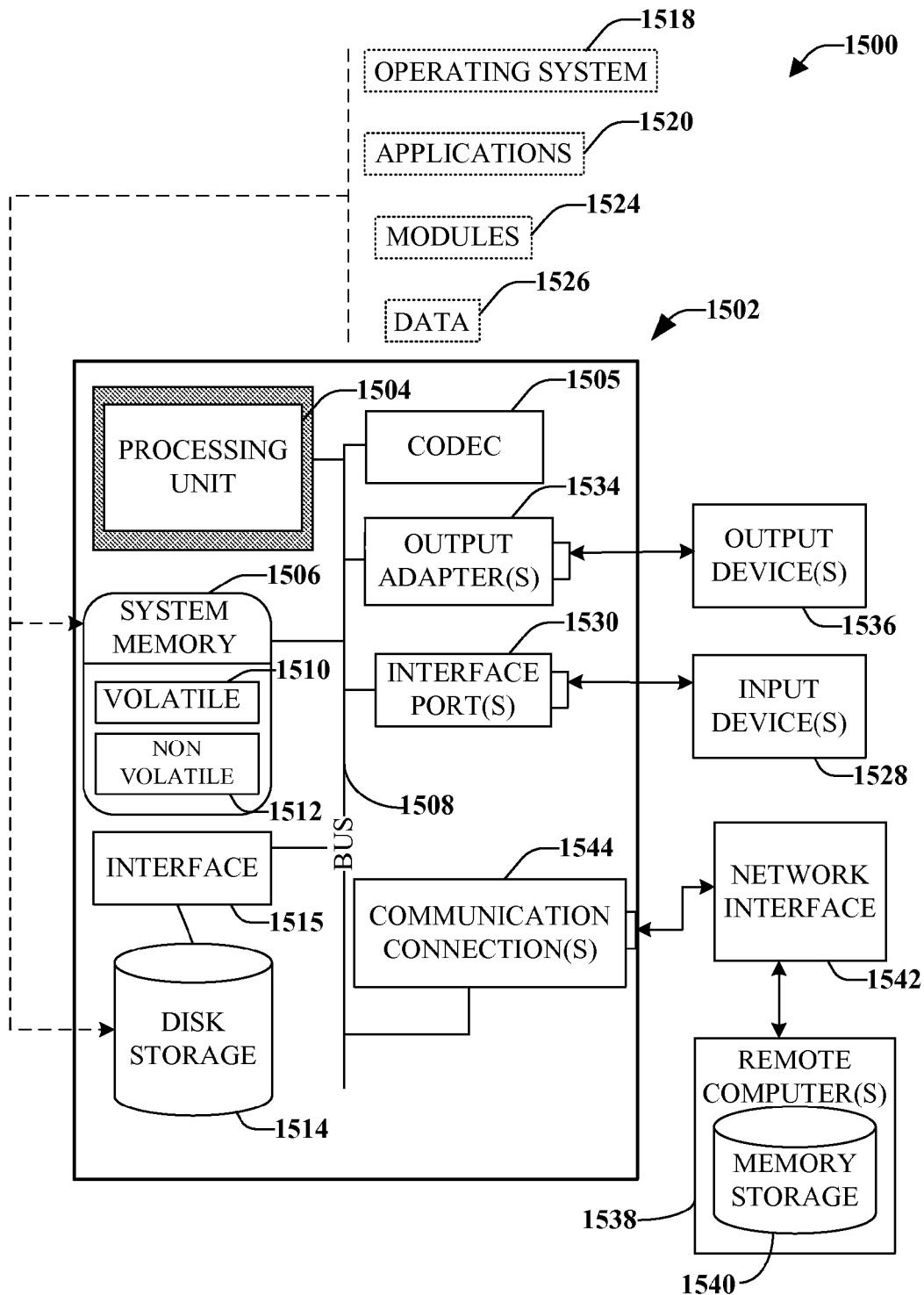
FIG. 15 is a block diagram representing an exemplary non-limiting networked environment in which the various embodiments can be implemented.

With reference to FIG. 15, a suitable environment 1500 for implementing various aspects of the claimed subject matter includes a computer 1502. The computer 1502 includes a processing unit 1504, a system memory 1506, a codec 1505, and a system bus 1508. The system bus 1508 couples system components including, but not limited to, the system memory 1506 to the processing unit 1504. The processing unit 1504 can be any of various available processors. Dual microprocessors and other multiprocessor architectures also can be employed as the processing unit 1504.

The system bus 1508 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1506 includes volatile memory 1510 and non-volatile memory 1512. The basic input/output system (BIOS), containing the basic routines to transfer information between elements within the computer 1502, such as during start-up, is stored in non-volatile memory 1512. In addition, according to present innovations, codec 1505 may include at least one of an encoder or decoder, wherein the at least one of an encoder or decoder may consist of hardware, a combination of hardware and software, or software. Although, codec 1505 is depicted as a separate component, codec 1505 may be contained within non-volatile memory 1512. By way of illustration, and not limitation, non-volatile memory 1512 can include read only memory (ROM), programmable ROM (PROM), electrically programmable ROM (EPROM), electrically erasable programmable ROM (EEPROM), or flash memory. Volatile memory 1510 includes random access memory (RAM), which acts as external cache memory. According to present aspects, the volatile memory may store the write operation retry logic (not shown in FIG. 15) and the like. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM.

Computer 1502 may also include removable/non-removable, volatile/non-volatile computer storage medium. FIG. 15 illustrates, for example, disk storage 1514. Disk storage 1514 includes, but is not limited to, devices like a magnetic disk drive, solid state disk (SSD) floppy disk drive, tape drive, Jaz drive, Zip drive, LS-70 drive, flash memory card, or memory stick. In addition, disk storage 1514 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1514 to the system bus 1508, a removable or non-removable interface is typically used, such as interface 1516.

It is to be appreciated that FIG. 15 describes software that acts as an intermediary between users and the basic computer resources described in the suitable operating environment 1500. Such software includes an operating system 1518. Operating system 1518, which can be stored on disk storage 1514, acts to control and allocate resources of the computer system 1502. Applications 1520 take advantage of the management of resources by the operating system through program modules 1524, and program data 1526, such as the boot/shutdown transaction table and the like, stored either in system memory 1506 or on disk storage 1514. It is to be appreciated that the claimed subject matter can be implemented with various operating systems or combinations of operating systems.

A user enters commands or information into the computer 1502 through input device(s) 1528. Input devices 1528 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1504 through the system bus 1508 via interface port(s) 1530. Interface port(s) 1530 include, for example, a serial port, a parallel port, a game port, and a universal serial bus (USB). Output device(s) 1536 use some of the same type of ports as input device(s) 1528. Thus, for example, a USB port may be used to provide input to computer 1502, and to output information from computer 1502 to an output device 1536. Output adapter 1534 is provided to illustrate that there are some output devices 1536 like monitors, speakers, and printers, among other output devices 1536, which require special adapters. The output adapters 1534 include, by way of illustration and not limitation, video and sound cards that provide a means of connection between the output device 1536 and the system bus 1508. It should be noted that other devices and/or systems of devices provide both input and output capabilities such as remote computer(s) 1538.

Computer 1502 can operate in a networked environment using logical connections to one or more remote computers, such as remote computer(s) 1538. The remote computer(s) 1538 can be a personal computer, a server, a router, a network PC, a workstation, a microprocessor based appliance, a peer device, a smart phone, a tablet, or other network node, and typically includes many of the elements described relative to computer 1502. For purposes of brevity, only a memory storage device 1540 is illustrated with remote computer(s) 1538. Remote computer(s) 1538 is logically connected to computer 1502 through a network interface 1542 and then connected via communication connection(s) 1544. Network interface 1542 encompasses wire and/or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1544 refers to the hardware/software employed to connect the network interface 1542 to the bus 1508. While communication connection 1544 is shown for illustrative clarity inside computer 1502, it can also be external to computer 1502. The hardware/software necessary for connection to the network interface 1542 includes, for exemplary purposes only, internal and external technologies such as, modems including regular telephone grade modems, cable modems and DSL modems, ISDN adapters, and wired and wireless Ethernet cards, hubs, and routers.

Figure 16:
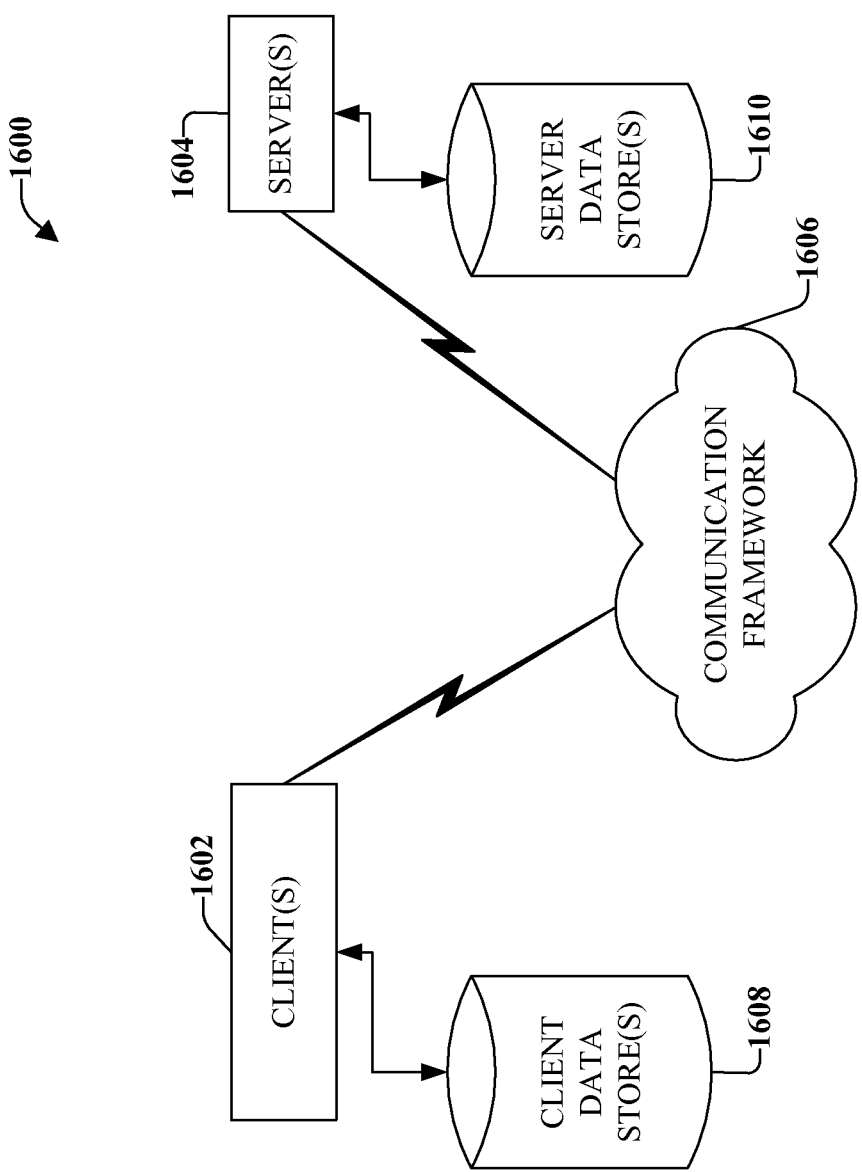
FIG. 16 is a block diagram representing an exemplary non-limiting computing system or operating environment in which the various embodiments may be implemented.

Referring now to FIG. 16, there is illustrated a schematic block diagram of a computing environment 1600 in accordance with this disclosure. The system 1600 includes one or more client(s) 1602 (e.g., laptops, smart phones, PDAs, media players, computers, portable electronic devices, tablets, and the like). The client(s) 1602 can be hardware and/or software (e.g., threads, processes, computing devices). The system 1600 also includes one or more server(s) 1604. The server(s) 1604 can also be hardware or hardware in combination with software (e.g., threads, processes, computing devices). The servers 1604 can house threads to perform transformations by employing aspects of this disclosure, for example. One possible communication between a client 1602 and a server 1604 can be in the form of a data packet transmitted between two or more computer processes wherein the data packet may include video data. The data packet can include a metadata, such as associated contextual information for example. The system 1600 includes a communication framework 1606 (e.g., a global communication network such as the Internet, or mobile network(s)) that can be employed to facilitate communications between the client(s) 1602 and the server(s) 1604.

Communications can be facilitated via a wired (including optical fiber) and/or wireless technology. The client(s) 1602 include or are operatively connected to one or more client data store(s) 1608 that can be employed to store information local to the client(s) 1602 (e.g., associated contextual information). Similarly, the server(s) 1604 are operatively include or are operatively connected to one or more server data store(s) 1610 that can be employed to store information local to the servers 1604.

In one embodiment, a client 1602 can transfer an encoded file, in accordance with the disclosed subject matter, to server 1604. Server 1604 can store the file, decode the file, or transmit the file to another client 1602. It is to be appreciated, that a client 1602 can also transfer uncompressed file to a server 1604 and server 1604 can compress the file in accordance with the disclosed subject matter. Likewise, server 1604 can encode video information and transmit the information via communication framework 1606 to one or more clients 1602.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described in this description can include electrical circuit(s) that can include components and circuitry elements of suitable value in order to implement the embodiments of the subject innovation(s). Furthermore, it can be appreciated that many of the various components can be implemented on one or more integrated circuit (IC) chips. For example, in one embodiment, a set of components can be implemented in a single IC chip. In other embodiments, one or more of respective components are fabricated or implemented on separate IC chips.

What has been described above includes examples of the embodiments of the disclosed subject matter. It is, of course, not possible to describe every conceivable combination of components or methodologies for purposes of describing the claimed subject matter, but it is to be appreciated that many further combinations and permutations of the subject innovation are possible. Accordingly, the claimed subject matter is intended to embrace all such alterations, modifications, and variations that fall within the spirit and scope of the appended claims. Moreover, the above description of illustrated embodiments of the subject disclosure, including what is described in the Abstract, is not intended to be exhaustive or to limit the disclosed embodiments to the precise forms disclosed. While specific embodiments and examples are described in this disclosure for illustrative purposes, various modifications are possible that are considered within the scope of such embodiments and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the disclosure illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described in this disclosure may also interact with one or more other components not specifically described in this disclosure but known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function; software stored on a computer readable storage medium; software transmitted on a computer readable transmission medium; or a combination thereof.

Moreover, the words "example" or "exemplary" are used in this disclosure to mean serving as an example, instance, or illustration. Any aspect or design described in this disclosure as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Computing devices typically include a variety of media, which can include computer-readable storage media and/or communications media, in which these two terms are used in this description differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal that can be transitory such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

In view of the exemplary systems described above, methodologies that may be implemented in accordance with the described subject matter will be better appreciated with reference to the flowcharts of the various figures. For simplicity of explanation, the methodologies are depicted and described as a series of acts. However, acts in accordance with this disclosure can occur in various orders and/or concurrently, and with other acts not presented and described in this disclosure. Furthermore, not all illustrated acts may be required to implement the methodologies in accordance with certain aspects of this disclosure. In addition, those skilled in the art will understand and appreciate that the methodologies could alternatively be represented as a series of interrelated states via a state diagram or events. Additionally, it should be appreciated that the methodologies disclosed in this disclosure are capable of being stored on an article of manufacture to facilitate transporting and transferring such methodologies to computing devices. The term article of manufacture, as used in this disclosure, is intended to encompass a computer program accessible from any computer-readable device or storage media.

What is claimed is:

1. A system comprising:
  a memory having stored thereon computer executable components; and
  a processor configured to execute the following computer executable components stored in the memory:
    a monitoring component that collects a plurality of event data related to user consumption of a set of media content items; and
    a summarization component that summarizes the event data into a finalized playback record according to an adjustable time window that is a function of a summation of an event time of a most recent event data of the plurality of event data, a logsaver latency time value indicative of a time delay associated with saving event data, and an inactivity threshold time value, in comparison to a current time.

2. The system of claim 1, wherein the summarization component summarizes the event data into the finalized playback record in response to the summation of the event time, the logsaver latency time value, and the inactivity threshold time value being less than the current wall time.

3. The system of claim 2, wherein the event data is at least one of pending event data or finalized event data.

4. The system of claim 2, wherein the logsaver latency time value is a predicted logsaver latency time.

5. The system of claim 2, further comprising a windowing component that adjusts the logsaver latency time value based in part on an observed logsaver latency time.

6. The system of claim 1, further comprising an abandoning component that generates at least one event data of the plurality event data upon at least one of a completion of a playback of a media content item of the set of media content items, a closing of a tab or a window associated with the user consumption of the media content item, or a navigation away from the user consumption of the media content item.

7. The system of claim 1, further comprising a diagnostic component that automatically diagnoses, from the finalized playback record, a network slowdown or computer effect that slows the user consumption a media content item of the set of media content items.

8. The system of claim 7, further comprising a repair component that automatically repairs the network slowdown or computer effect.

9. The system of claim 1, further comprising:
wherein the plurality of event data is associated with a first time zone; and
a modification component that adjusts at least one media content item of the set of media contents for user consumption in a second time zone based upon the finalized playback record.

10. A method, comprising:
capturing, by a system including a processor, a plurality of watch time event data related to user consumption of a set of media content items; and
summarizing, by the system, the watch time event data into a finalized playback record according to a finalization criteria is a function of a summation of an event time of a most recent event data of the plurality of event data, a logsaver latency time value indicative of a time delay associated with saving event data, and an inactivity threshold time value, in comparison to a current time.

11. The method of claim 10, wherein the summarizing is initiated in response to the summation of the event time, the logsaver latency time value, and the inactivity threshold time value being less than the current time.

12. The method of claim 11, wherein the event data is at least one of pending event data or finalized event data.

13. The method of claim 11, wherein the logsaver latency time value is a predicted logsaver latency time.

14. The method of claim 11, further comprising adjusting, by the system, the logsaver latency time value based in part on an observed logsaver latency time.

15. The method of claim 10, further comprising capturing watch time event data upon at least one of a completion of a playback of a media content item of the set of media content items, a closing of a tab or a window associated with the user consumption of the media content item, or user a navigation away from the user consumption of the media content item.

16. The method of claim 10, further comprising automatically, from the finalized playback record, a network slowdown or computer effect that slows the user consumption a media content item of the set of media content items.

17. The method of claim 16, further comprising automatically repairing the network slowdown or computer effect.

18. The method of claim 10, further comprising:
wherein the plurality of event data is associated with a first time zone; and
adjusting at least one media content item of the set of media contents for user consumption in a second time zone based upon the finalized playback record.

19. A non-transitory computer-readable medium having instructions stored thereon that, in response to execution, cause a system including a processor to perform operations comprising:
accumulating a plurality of event data related to user consumption of a set of media content items; and
summarizing, by the system, the event data into a finalized playback record according to an dynamically set time window that is a function of a summation of an event time of a most recent event data of the plurality of event data, a logsaver latency time value indicative of a time delay associated with saving event data, and an inactivity threshold time value, in comparison to a current time.

20. The non-transitory computer-readable medium of claim 19, wherein the summarizing is initiated in response to the summation of the event time, the logsaver latency time value, and the inactivity threshold time value being less than the current time.

* * * * *